US011176520B2

United States Patent
Ramakrishnan

(10) Patent No.: US 11,176,520 B2
(45) Date of Patent: Nov. 16, 2021

(54) EMAIL CONTENT MODIFICATION SYSTEM

(71) Applicant: Microsoft Technology Licensing, LLC, Redmond, WA (US)

(72) Inventor: Manoj Ramakrishnan, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/388,484

(22) Filed: Apr. 18, 2019

(65) Prior Publication Data

US 2020/0334639 A1  Oct. 22, 2020

(51) Int. Cl.
*G06F 15/173* (2006.01)
*G06Q 10/10* (2012.01)
*H04L 12/58* (2006.01)

(52) U.S. Cl.
CPC .......... *G06Q 10/107* (2013.01); *H04L 51/08* (2013.01); *H04L 51/14* (2013.01)

(58) Field of Classification Search
CPC ........ H04L 51/08; H04L 51/14; G06Q 10/107
See application file for complete search history.

(56) References Cited

U.S. PATENT DOCUMENTS

| 8,296,140 | B2* | 10/2012 | Bangalore | G06F 40/30 |
| | | | | 704/251 |
| 8,645,430 | B2* | 2/2014 | Khouri | H04L 51/00 |
| | | | | 707/802 |
| 2009/0210505 | A1* | 8/2009 | Thomas | H04L 51/12 |
| | | | | 709/206 |
| 2013/0054435 | A1* | 2/2013 | Zhang | G06Q 40/02 |
| | | | | 705/35 |
| 2013/0097269 | A1* | 4/2013 | Plotkin | H04L 51/02 |
| | | | | 709/206 |
| 2014/0074842 | A1* | 3/2014 | Tai | G06Q 10/107 |
| | | | | 707/737 |
| 2015/0089007 | A1 | 3/2015 | Amoroso et al. | |

FOREIGN PATENT DOCUMENTS

WO  2017112786 A1  6/2017
WO  2019027549 A1  2/2019

OTHER PUBLICATIONS

Carbune, et al., "Context Based Automatic Email Responses", In Technical Disclosure Commons, Nov. 7, 2017, 8 Pages.
"International Search Report and Written Opinion issued in PCT Application No. PCT/US2020/024369", dated Jun. 4, 2020, 11 Pages.

* cited by examiner

*Primary Examiner* — Thanh T Nguyen
(74) *Attorney, Agent, or Firm* — Schwegman Lundberg & Woessner, P.A.

(57) ABSTRACT

A method may include configuring a processor to monitor, in an application, composition of an electronic communication addressed to a second user from a first user, the electronic communication associated with a set of parameters; determine an intent of the electronic communication based on the set of parameters; search an associative data structure to retrieve content associated with the intent, the content previously transmitted to a third user from the first user or content(s) received from a fourth user(s); and present a suggestion in the application to include the retrieved content in the electronic communication

20 Claims, 6 Drawing Sheets

TO: HOLLY@DOMAIN.COM

CC:

BCC:                              406

FOUND 1 SUGGESTION BASED ON THIS EMAIL CONTEXT – ATTACH THE FILE OR PREVIEW

STATUS REPORT.DOCX

408

FROM: HOLLY@DOMAIN.COM
SENT: JANUARY 1, 2019
TO: AMY@DOMAIN.COM

HI XYZ,

CAN YOU PLEASE SEND ME THE STATUS REPORT FOR THIS MONTH?

402

404

TO: JIM@DOMAIN.COM

CC:

BCC:

ATTACHMENT(S): STATUS REPORT.DOCX

I'VE ATTACHED THE STATUS REPORT, THANKS.

FROM: JIM@DOMAIN.COM
SENT: DECEMBER 20, 2018
TO: AMY@DOMAIN.COM

HI XYZ,

CAN YOU PLEASE SEND ME THE STATUS REPORT FOR THIS MONTH?

FIG. 4

EMAIL CONTENT MODIFICATION SYSTEM

BACKGROUND

Email applications are often limited in their ability to assist users in composing emails beyond formatting and basic checks. For example, an application may offer spell checking or grammar checking. Some email applications may provide intelligent features such as auto-complete suggestions; however, the suggestions are often based on the current contents of an email.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 4 is an example representation of suggesting a file based on a previous email, according to various examples.

DETAILED DESCRIPTION

In the following description, for purposes of explanation, numerous specific details are set forth in order to provide a thorough understanding of some example embodiments. It will be evident, however, to one skilled in the art that the present invention may be practiced without specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. User interfaces may be provided for an end-user or administrator to edit the variable values in some instances.

As indicated above, there are a number of deficiencies in current email applications that prevent them from assisting a user in composing emails beyond a limited set of formatting and basic auto-complete suggestions. One of the technical challenges in presenting more intelligent suggestions is the lack of information beyond a current email thread. Without this information, the email application may be unable to present suggestions based on the context of email threads beyond the currently viewed thread.

Accordingly, this disclosure—among other improvements to email applications—describes improvements by creating an associative data structure (e.g., a map, graph) that maintains a link between an intent of an email and content placed in an email with respect to that intent. By populating this associative data structure over time, an email application may then be able to make suggestions to a user based on prior actions taken by the user in other email threads.

Figure 1:
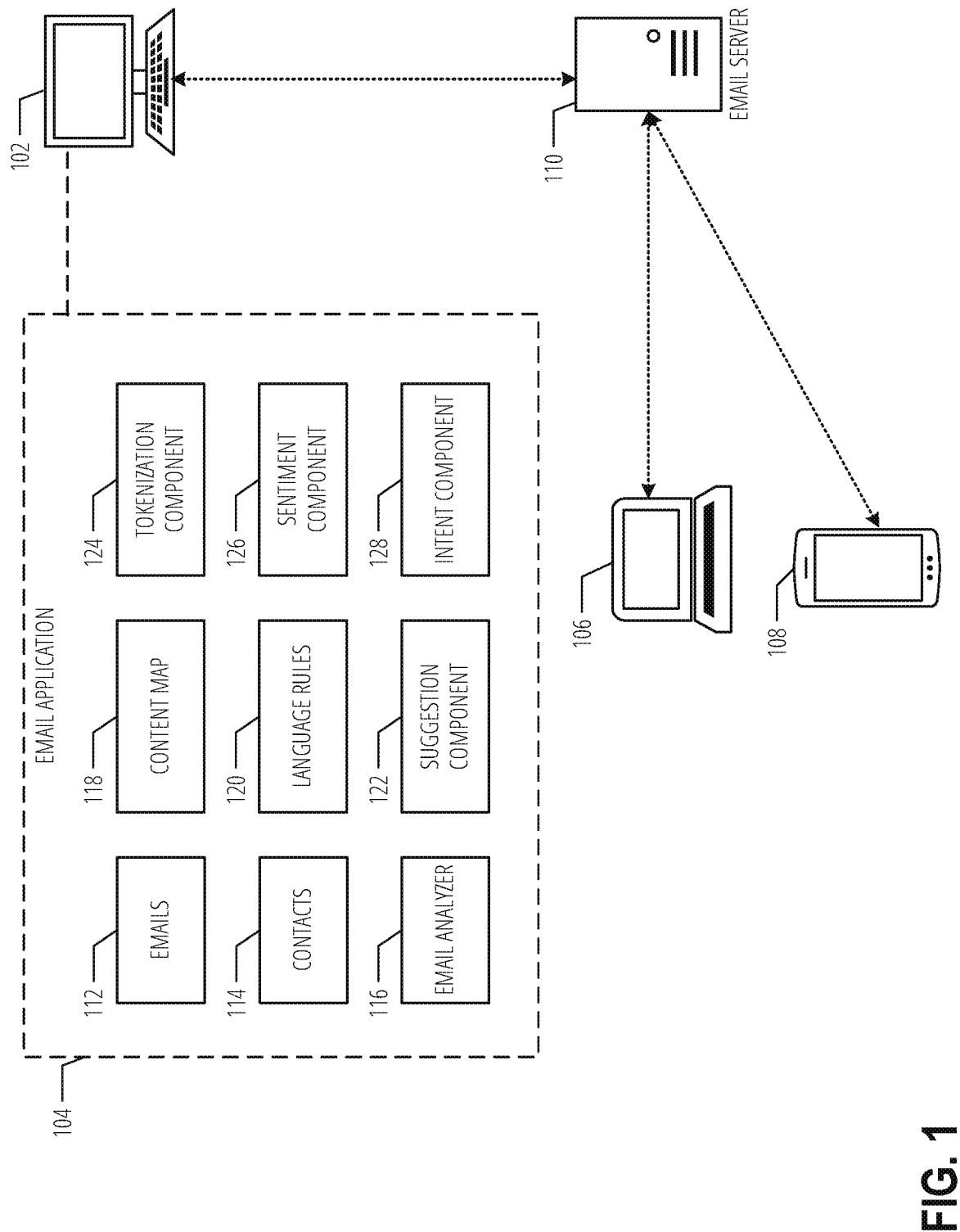
FIG. 1 is a schematic diagram illustrating components of an email application, according to various examples.

FIG. 1 is a schematic diagram illustrating components of an email application, according to various examples. The diagram includes computing devices 102, 106, 108. The computing devices may be, but are not limited to, a smartphone, tablet, laptop, multi-processor system, microprocessor-based or programmable consumer electronics, game console, set-top box, or any other device that a user utilizes to communicate over a network. In example embodiments, the computing devices include a display module (not shown) to display information (e.g., in the form of specially configured user interfaces for email composition). In some embodiments, the computing devices may include one or more of a touch screen, camera, keyboard, microphone, and Global Positioning System (GPS) device Computing device 102 is illustrated as including email application 104. Computing devices 106, 108 may also include an email application such as email application 104. Email application 104 may include email 112, contacts 114, email analyzer 116, content map 118, language rules 120, suggestion component 122, tokenization component 124, sentiment component 126, and intent component 128.

For illustration purposes, email application 104 is illustrated as set of separate functional units (e.g., email analyzer 116, suggestion component 122, tokenization component 124, sentiment component 126, etc.). However, the functionality of multiple functional units may be performed by a single unit. A functional unit may represent computer program code that is executable by a processing unit (e.g., a core of a general-purpose computer processor, a graphical processing unit, an application specific integrated circuit, etc.). The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

In various examples, the computing devices and servers in FIG. 1 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth), Wi-Fi Direct), or other combinations or permutations of network protocols and network types. A network may include a single local area network (LAN) or wide-area network (WAN), or combinations of LAN's or WAN's, such as the Internet.

Computing device 102 may send and receive emails 112 to one or more other computing devices (such as computing devices of contacts 114 or other people) using email application 104. Email application 104 may include a user interface that is presented on a display device of computing device 102. Email application 104 may be a native application stored on computing device 102. In some examples, email application 104 may be served from a web server and presented as a web application on a display device of computing device 102 via a web browser. Presenting from a web server may include transmission of data for display on the display device of computing device 102.

An e-mail may have a number of parameters such as recipients (in the "to", "cc" or "bcc" line), a sender, a subject line, and body. When an email is part of a thread, the previously sent/received emails may be considered part of the body. Accordingly, an email thread may be parsed to see what one user asked for and the response to that email. Sometimes a thread involves more than one back and forth set of communications. For example, Alice may request some information from Bob. Bob may then respond with a clarifying question to which Alice may responds. Finally, Bob may provide the information requested by Alice.

Email analyzer 116 may analyze each email when it arrives (as well as sent emails) at a user's inbox (e.g., via email server 110). In some examples, email analyzer 116 may process all of emails 112. Processing all of emails 112 may occur when no emails have been previously processed and content map 118 is empty. Processing may include invoking one or more of suggestion component 122, tokenization component 124, sentiment component 126, and intent component 128.

Tokenization component 124 may parse one or more parameters of an email and convert it into one more or tokens. Tokenization may be performed by parsing a string and breaking it up into multiple elements based on a defined set of delimiters that are removed from the string. For example, a body of an email may include the sentence "Please send me your home address." If the delimiters include punctuation and spaces, the sentence may result in six tokens: "Please", "send", "me", "your" "home", and "address."

Some of the tokens may be recombined to create multiword tokens (e.g., phrases). For example, "home" and "address" may be combined to create a token of "home address." Deciding when to recombine tokens may include querying a dictionary to see if the combined token is included in the dictionary. In another examples, tokenization component 124 may perform a parts-of-speech natural language processing tagging (e.g., using the Stanford Log-linear Part-Of-Speech Tagger or similar process). Based on the output of the tagging it may be determined that "home address" is a single phrase that should not be split up. Combinations may also be determined based on frequency of co-occurrence (e.g., the two words are adjacent in a particular order) across a corpus of emails. For example, if the terms "home" and "address" are next to each other in more than some threshold number of emails, it may be assumed that the terms create a phrase that should be a single token.

In various examples, multi-work tokens are automatically generated up to a certain number of words. For example, in addition to the single word tokens described above using "Please send me your home address" there may "please send," "please send me," and "please send me your" tokens—as well as the remaining combinations.

In some examples, the token is the unchanged parameter. For example, when an email recipient is sent to "abc@domain.com" the token may be "abc@domain.com." In other examples, a recipient's address may be broken apart into two tokens: "abc" and "domain.com". A similar tokenization process may be performed for recipients in the "cc" and "bcc" fields.

Sentiment component 126 may use natural language processing—or another artificial intelligence technique—to assign a sentiment score to a one or more parts of an email. The sentiment range may be negative and positive. A basic sentiment analysis may look for the ratio of positive to negative words (as stored in predefined dictionaries) in a sentence (e.g. the subject of an email), paragraph, or entire body of the email. More complex analysis may include inputting the email into a trained neural network to obtain a probability that the email has a positive or negative sentiment.

Intent component 128 may use natural language processing—or another artificial intelligence technique—to categorize the intent of an email. As an example, a set of predefined categories may be used such as requests for status updates, requests for files, request for location information, etc. A category may be associated with one or more keywords. Accordingly, the more keywords an email matches, the more likely it is in the category.

More complex methods may also be used. For examples, sentences of an email may be parsed and tagged for parts of speech as described above. Consequently, the intent of the email based on the results of the tagging. For examples, if the verb is "send" and the direct object of "send" is "your address" the intent may be a location request. Sets of verbs may be standardized such that terms like give, send, and request are all categorized as "send."

Content map 118 may be an associative data structure based on the results of email analyzer 116. Content map 118 may be user specific in various examples. Thus, Alice may have a different content map than Bob. Although a specific map data structure is described, other data structures may also be used (e.g., a database, graph, etc.) without departing from the scope of this disclosure. Content map 118 may include unique (key, value) pairs (or other tuple) where the key is a token and the value is an intent. In some examples, content map 118 may be stored as a tree data structure to allow for more efficient searching. A more complex map may permit a sing entry to have multiple intents for a single token. This may be useful when different intent terms have relatively the same meaning such as "give", "request", "send."

Consider the following three sentences (1) "Where is your home?"; (2) "What is your address"; and (3) "What is your home address." In all three example sentences, the intent is a request for location information, but the language is different. A simplified analysis may create three pairs (home, request), (address, request), and (home address, request).

Email analyzer 116 may also analyze email threads to determine content used in responses to requests. All or part of an emailed response to a request may be considered a content item. Content items may include a data file (e.g., a name of a spreadsheet document, picture, etc.) or text (e.g., an address or status update). Entries in content map 118 may be linked to the content items used in response to the (token, intent) pair. A pair may be linked (e.g., stores a pointer to or stores the actual content) with multiple pieces of content items in some examples. For example, Alice may respond to Bob in a different way than to Charlie.

In some examples, content map 118 accounts for the sender of the email during linking. Thus, if Charlie asks for a status update, suggestion component 122 may query content map 118 for the token ("status update, request") and see if there is content associated with the pair and sender Charlie. If there is not a Charlie specific entry, suggestion component 122 (discussed in more detail below) may present content sent to other users in response to a status update request. In various examples, instead of the precise sender, the domain of the sender may be used.

Content map 118 may be arranged in a weighted hierarchical graph. For example, a node with the token "home address" may be the parent node (ignoring the intent for discussion purposes) of a "home" node and an "address"

node. Thus, content associated with the "home" node and "address" node is inherited by the "home address" token. Each node may also have a weight based on frequency of use within an email corpus. Accordingly, if the "home" node has a weight of 0.2 and the "address" node has a weight of 0.8, the "home address" node would have a weight of 1.

Email analyzer 116 may also use language rules 120 to suggest (e.g., using suggestion component 122) altering the language. Language rules 120 may be a dictionary of words that may not be appropriate in certain professional settings (e.g., swear words). Language rules 120 may also be logical rules based on the output of sentiment component 126. For example, if a sentence is too negative (e.g., based on a threshold), suggestion component 122 may highlight the offending sentence or paragraph and suggest changing it.

Email analyzer 116 may also analyze emails for actions to take. For example, intent component 128 may determine that an intent of an email is a request for some task to be performed by the user such as "Please create a report for XYZ project." Email analyzer 116 may store these tasks in a database (or other data structure) and periodically (e.g., daily) display them to the user. A user may be able to snooze a task for a period of time or mark it complete. The tasks may also be sorted/filtered (by sender, date received, etc.) by the user in a presented user interface of contacts 114.

Figure 2:
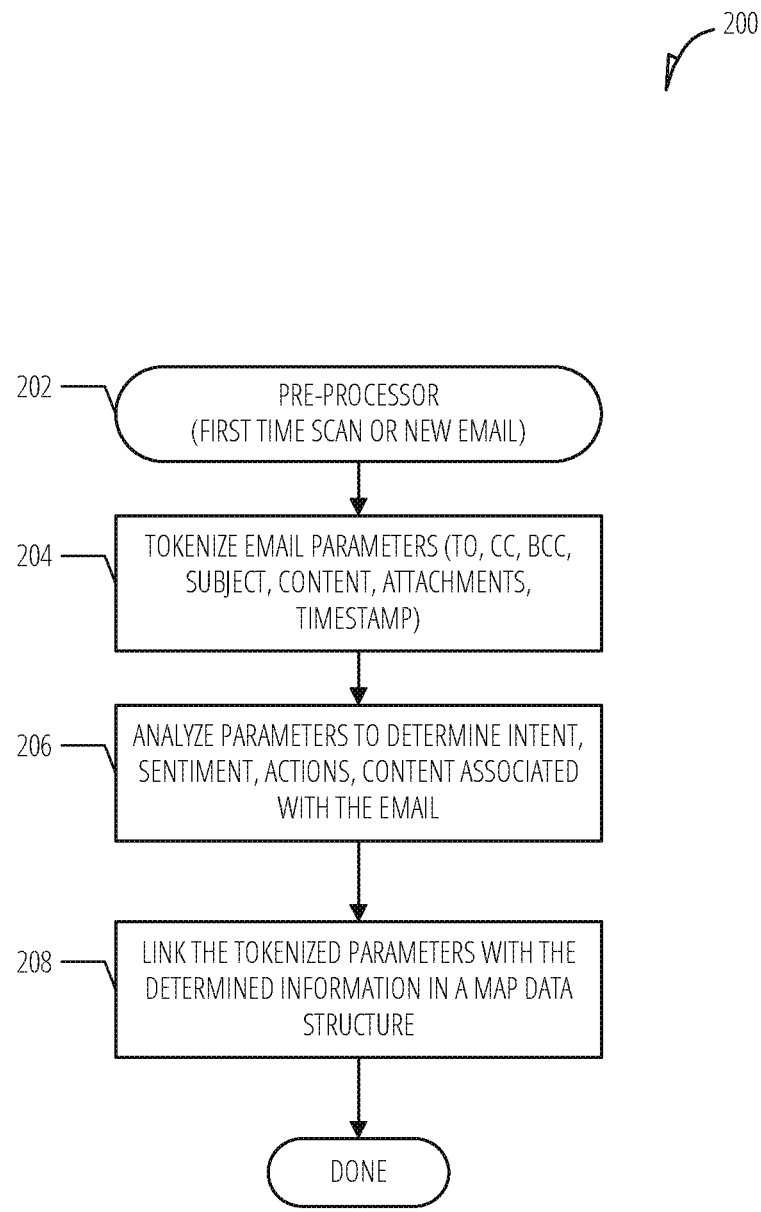
FIG. 2 is a flowchart illustrating a process of populating a content map, according to various examples.

FIG. 2 is a flowchart illustrating a process (e.g., method) 200 of populating a content map, according to various examples. The method is represented as a set of blocks that describe operations 202-208 of process 200. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 2. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

All or part of process 200 may be performed on the same computing device that includes an email application (e.g., computing device 102). In various examples some or all of the processing is performed at a server such as email server 110. The process begins with operation 202. Operation 202 may be a pre-processing step that recognizes that a new email has arrived at a mailbox of a user. In various examples, the pre-processing may be performed when a mailbox is scanned for the first time to populate a content map (e.g., content map 118). For example, a user may install a plug-in for email application 104 and select a user interface element of the plug-in to begin process 200 on all of the stored email for the user.

Because of the sensitive nature of the content of emails certain precautions may be taken before the processing begins. For example, a privacy notice may be presented to the user indicating that the content of their emails may be processed only to the extent necessary to present the suggestions. Periodically, a reminder may be presented to the user and give the user an option to discontinue the processing and delete their content map. In various examples, a content map is associated with a single user.

At operation 204, the parameters in the email may be tokenized. The parameters may be the domain of the recipients of an email, the subject line, body content, file names, and timestamp. Tokenization may be performed by a component executing on a processing unit such as tokenization component 124. The result of operation 204 may be a set of one or more tokens.

At operation 206, in various examples, the parameters may be analyzed to determine the intent (e.g., using intent component 128), sentiment (e.g. using sentiment component 126), actions, and/or content associated with the email. To determine the actions and content associated with the email, a response to the email may be analyzed in conjunction with the originally sent email. For example, an address may be sent back, or a file may be attached.

At operation 208, the tokenized parameters may be linked to the determined information from operation 206, in a map data structure (e.g., a content map). In some examples, linking may include creating a node in a graph (or entry in a table) for each token from operation 204. The node may include the token and the intent, in various examples. The content may be linked to each of the created nodes (e.g., using an identifier number). Other information may be also be stored in a node such as sentiment.

Accordingly, for a single email, there may be many tokens associated with the same piece of content. Over a sequence of analyzing multiple emails (e.g., a user's entire mailbox) a single token may be associated with multiple pieces of content. The content may also have a weight associated with respect to an individual token-which may be stored with an identification of the content in the token. Thus, if the same piece of content is sent in response to a number of emails with "home address" it may be weighted higher than a piece of content that was only used once in response to an email with "home address". The weighting formula be set pro rata for all content associated with a token or be a count of the number of times content is associated with a token in various examples, among other weighting schemes. At operation 210, the process ends.

Figure 3:
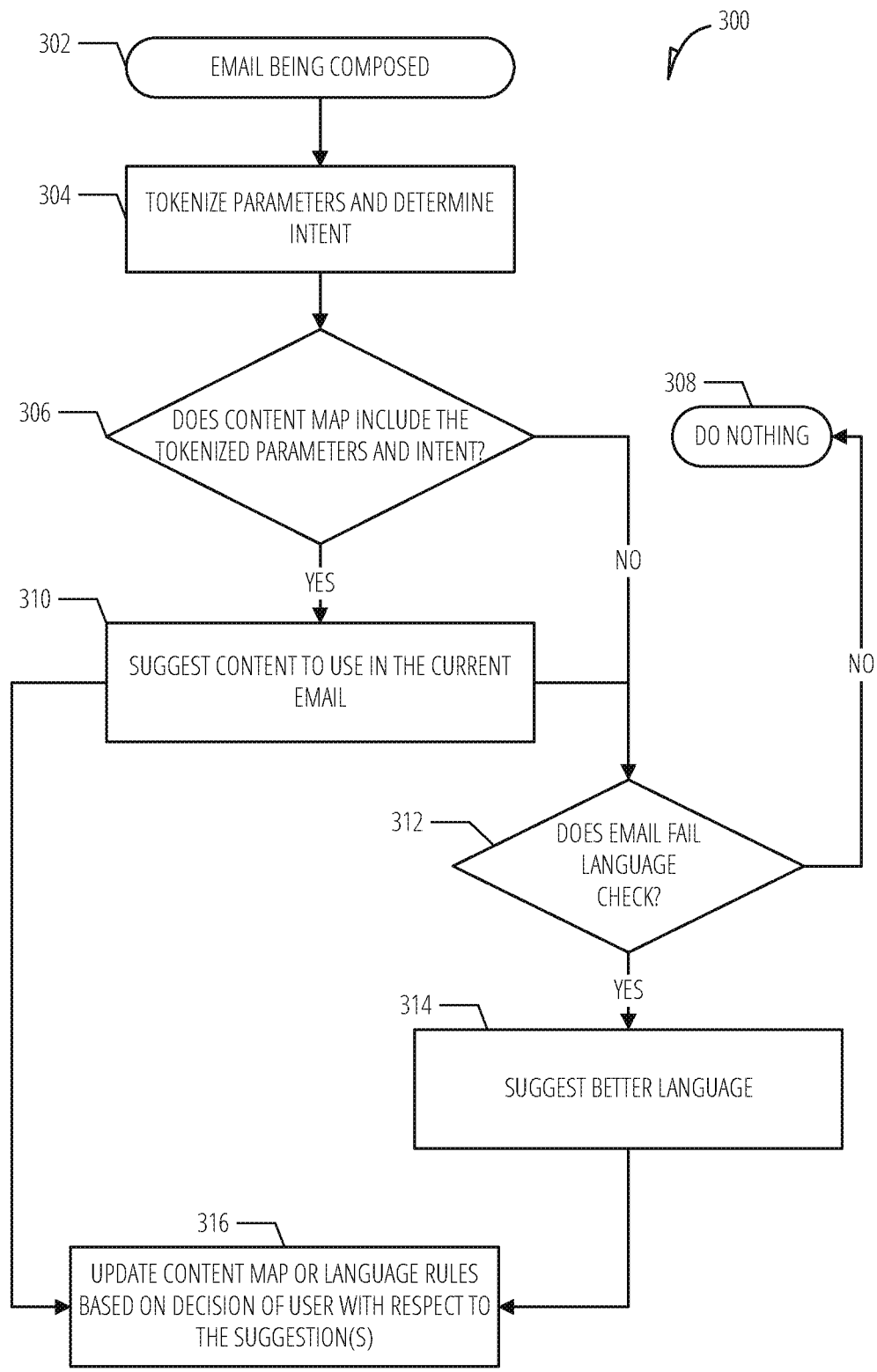
FIG. 3 is a flowchart illustrating a process of suggesting content and updating a content map, according to various examples.

FIG. 3 is a flowchart illustrating a process 300 of suggesting content and updating a content map, according to various examples. A method is represented as a set of blocks that describe operations 302-316 of process 300. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 3. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

Process 300 may be part of a plugin or computer code of an email application (e.g., email application 104) that monitors actions taken in the email application. For example, actions taken in or by the application may be considered events. Code may run in response to those events. For example, at operation 302, the event may be an being composed. The composed email may be in response to a received email—thus including an email chain—or a new email.

At operation 304 the parameters of the email may be tokenized and an intent (or more than one) may be determined. The tokenization may be performed at a variety of times. For example, if the email is a reply email, all the previous emails in the chain may be tokenized when the reply email is first being composed. If the email is a new email, the body of the email may be periodically (e.g., after every sentence, paragraph, etc.) scanned and tokenized, or the email be tokenized in response to a user clicking send. The tokenization and intent may be determined as described with respect to tokenization component 124 and intent component 128. In some examples, a sentiment may also be determined at operation 304.

At operation 306, it may be determined whether a content map (e.g., an associative data structure) include an entry with the tokenized parameters and intent. There may be multiple matched entries in some instances. As described above, a content map may be a set of tuples (e.g., [token, intent]) that are each associated with a set of respective content items. Accordingly, the content map may be searched or queried with a tuple created by the tokenized parameters and intent. For example, consider that the email is a reply email and that the one of the tokens was "work address" and the intent was "send." The content map may be queried for an entry with ["work address": "send" ]. The flow of the process continues to operation 310 if there was at least one match in the content map. If not, flow continues to operation 312.

At operation 310, one or more content suggestions may be presented to a user within the email application. For example, consider there was a match in the content map for ["work address": "send"]. The match may be associated with one or more content items such as "123 corporate way, business town, USA." The content item may include formatting (e.g., font size, underlining, etc.) in various examples. The content item may be a name of a file and the suggestion may present an option to attach the file to the email. The content item may be presented to the user in a variety of manners such as a pop-up box, an in-line suggestion, etc.

There may be multiple matches in the content map, and for each match there may be multiple content items. As discussed previously, weights may be assigned to the content items that reflect how strongly a content item is linked with a given tokenized parameter. In order to not overload a user with too much information, and use the inherently limited amount of display space, a subset of the matched content items may be presented. For example, common tokenized words or phrases may be associated with thousands of content items: however, each individual content item will likely have a low weight. In contrast, a token like "work address" or "status update" will have comparatively fewer content items associated with it and have a higher weight. Accordingly, the subset may be based on a threshold level of the weights or a nominal maximum (e.g., the top three content suggestions).

The number of tokens that match with the same content item may be used to determine the top suggestion. For example, consider that the intent of an email is determined to be a request for a file and the email was sent from UserX@ABC.com. The content map may have numerous files (e.g., content items) associated with an entry for ["file": "send" ] due to the fact that the user has sent many files in response to requests. Similarly, the content map may have numerous files associated with an entry for ["ABC.com", "send"]. Thus, either entry alone may not be of much use to suggest a file with any high degree of accuracy. The overlap, however, of files associated with ["file": "send" ] and ["ABC.com", "send" ] may be used to suggest a file as it may be likely if the user previously sent a file to a user at ABC.com the user may send the same file to another (or the same) user at ABC.com—as opposed to another domain.

At operation, 312 the email may be parsed to determine if it fails a language check. The language check may be based on the rules stored in language rules 120. For example, certain words may be flagged as being potentially inappropriate. The language check may also include performing a sentiment analysis to see if the sentiment of the email (or specific sentence) is too negative (e.g., below a certain threshold). The words or sentences that fail a rule or are too negative may be flagged (e.g., underlined, bolded, etc.) in the email and at operation 314 a suggestion may be made to try and use better language to the user. If the language of the email passes the language check, flow continues to operation 308 where the process ends.

The content map and/or language rules may be updated based on the decision of a user with respect to any presented suggestions at operation 316. For example, the weight of a content item may be increased when the suggestion is accepted by the user. If there are three suggestions and the top ranked (by weight) suggestion is not selected, the weight of the content item with respect to the matched token for the top ranked suggestion may be decreased. The amount to increase or decrease a weight may be based on a stored formula (e.g., a percentage decrease, a nominal decrease, etc.).

If a user declines to make a change to the language of an email based on a presented suggestion, a language rule may be updated. Updating may include ignoring future uses of a keyword that triggered the suggestion such that the next time the user uses that keyword a suggestion is not presented. If a user declines to make a change based on a sentiment threshold, the threshold may be changed such that the language may be more negative before a suggestion is triggered.

FIG. 4 is an example representation of suggesting a file based on a previous email, according to various examples. FIG. 4 includes current email 402, past email 404, suggestion prompt 406, and file 408. As illustrated, previous email 404 was from Jim and requested a status update from Amy. In response, Amy sent attached a document with filename "status report.docx."

Current email 402 may be created in response to Amy clicking reply in an email application on an email from Holly. As illustrated, Holly has similarly asked Amy for a status report. When Amy clicks reply, email application 104 may locally or remotely tokenize the parameters of Holly's email and determine an intent of the email requesting the status report. Amy's content map may be searched for previous content associated with the tokens and intent. In the present instance, a match may be found that indicates "status report.docx" was previously attached-based on a prior analysis of previous email 404.

Accordingly, suggestion prompt 406 may be presented in the email application to Jim. The prompt may include the number of suggestions found in the content map—subject to any thresholds, weights, etc.—and an identification of the content item. Here, prompt 406 includes file 408 as the content item. A user may click on file 408 to have it attached to current email 402.

In another scenario, email application 104 may also suggest rephrasing an email based on prior analysis of back-and-forth emails. For example, consider that user A sends an email to user B asking a question such as "Please send an update." User B may respond with "Status is green for the project." At this point, User A may respond to User B with an additional query of "Can you please send me more details about what tasks are pending and blocked?" The phrase "Can you please send me more details about what tasks are pending and blocked?" may be considered a content item associated with tokens created by "Please send an update."

Now, User A may compose an email to User D asking, "Please send an update." Email application 104 may analyze this email (before sending) to tokenize its parameters and determine its intent as previously discussed. Querying the content map based on the analysis may return "Can you please send me more details about what tasks are pending and blocked?" as an associated content item. Then, email application 104 may suggest adding the associated content item (or replacing the current body of the email) to the currently composed email.

Figure 5:
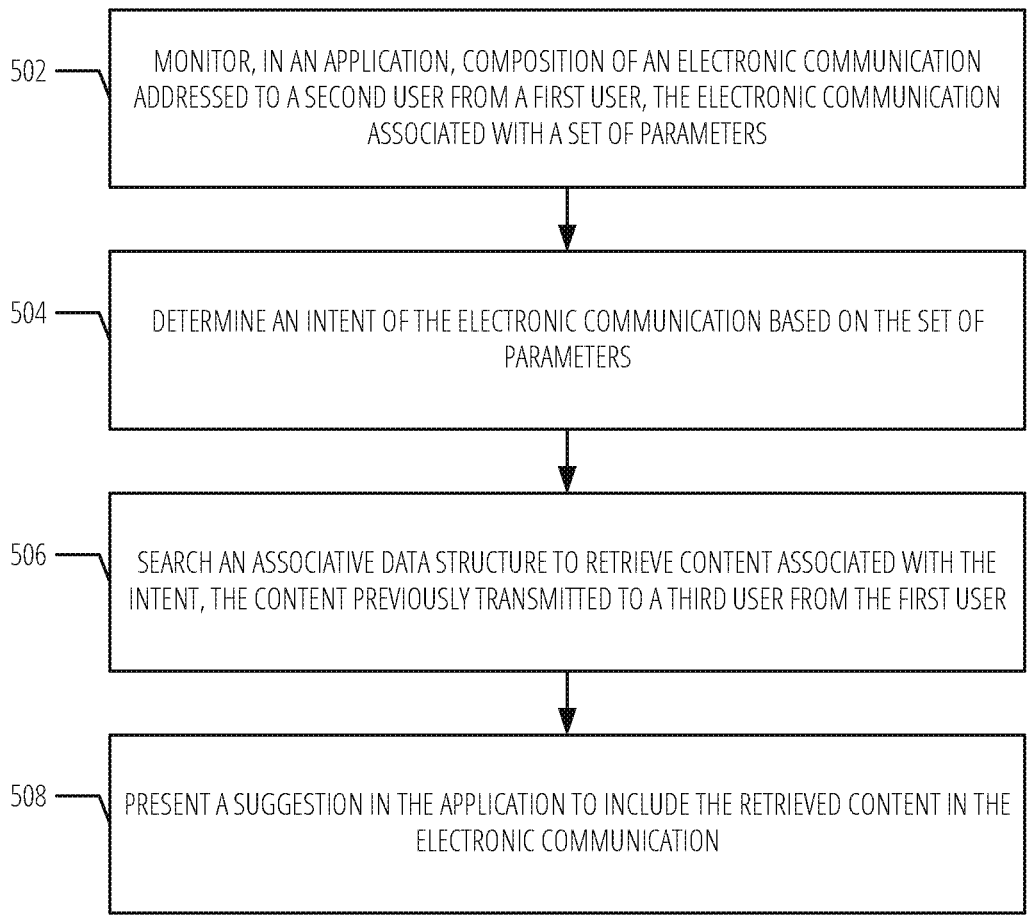
FIG. 5 is a flowchart illustrating a method to suggest content to a user, according to various examples.

FIG. 5 is a flowchart illustrating a method to suggest content to a user, according to various examples. The method is represented as a set of blocks that describe operations 502-508 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 5. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At block 502, in various examples, a processor may monitor, in an application, composition of an electronic communication addressed to a second user from a first user. The application may be an email application. Monitoring may include capturing keystrokes of the user or using an API of the email application to determine actions taken by a user. Composition may include a user clicking reply of a received email or generating a new email. The electronic communication may be associated with a set of parameters. The parameters may be email addresses, subject lines, or a body of the email, in various examples.

Parameters may also include email addresses, subject lines, or a body of emails that are part of a thread of emails. For example, the composed electronic communication may be a response electronic communication to a transmitted electronic communication from the second user. Thus, the parameters may include the contents of the transmitted electronic communication as well as the parameters of the response electronic communication.

At block 504, in various examples, a processor may determine an intent of the electronic communication based on the set of parameters. For example, natural language processing may be used to determine if the body of the electronic communication includes a request for an attachment, an address, etc. The intent may be determined using intent component 128 in various examples. The intent may also be determined for the body of an email currently being drafted.

At block 506, in various examples, a processor may search an associative data structure to retrieve content associated with the intent. The content may have been previously transmitted to a third user (or more) from the first user. For example, the retrieved content may be an electronic file transmitted to the third user from the first user associated with a request for an attachment (e.g., the intent). The associative data store may be a data structure such as content map 118.

In another example, the content may have been received from a third user by the first user with a similar intent. In some examples there may be multiple intents and therefore multiple suggestions may be made. For example, the first user may have received an email from a second user requesting a project status report and a summary from a meeting that took place the previous day. The summary may have been sent to the first user by a third user and the summary may have been sent to the first user by a fourth user. When composing the reply message, the previously received report and summary may be presented as suggestions to the first user.

The set of parameters may also be tokenized. For example, the body of electronic communication may be parsed into individual words or phrases. In an example, a parameter of the set of parameters is tokenized as described with respect to tokenization component 124. The associative data structure may be configured to have entries with token, intent pairs. In an example, the content associated with the intent is also associated with the tokenized parameter in the associative data structure (e.g., the token, intent pair is associated with the content).

In various examples, the electronic communication ma be a new electronic communication to the second user and wherein the intent is a request for information. The retrieved content may be content transmitted to the third user from the first user in a response to a reply electronic communication from the third user to the first user. This scenario may be one in which the application has recognized that the first user has had to follow-up or clarify an initial question. Thus, the retrieved content may be what the user has followed-up with in the past, and the first user is given an opportunity to put the follow-up sentence in now to avoid unnecessary emails.

In various examples, the electronic communication is a response electronic communication to a transmitted electronic communication from the second user and wherein the intent is a request for location information. The retrieved content may be location information transmitted to the third user from the first user associated with the request. The location information may be a weblink or text, in various examples.

At block 508, in various examples, a processor may present a suggestion in the application to include the retrieved content in the electronic communication. For example, a pop-up message box may be displayed with the content and a user interface element to use or not use the suggestion. In various examples, the associative data structure may be updated based on a decision to not use the suggestion. Updating may include decreasing a weight associated with the retrieved content item with respect to the intent.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
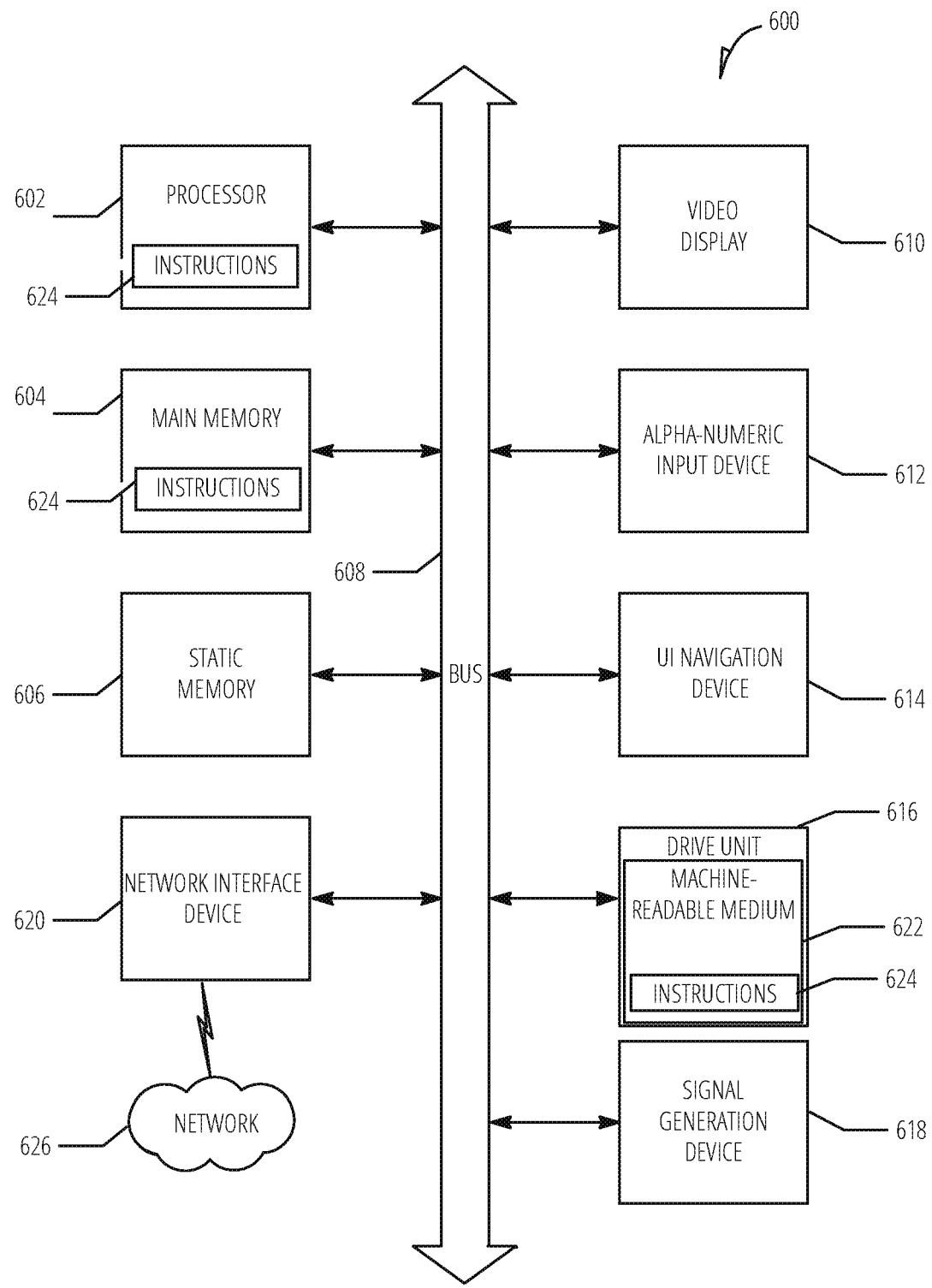
FIG. 6 is a block diagram illustrating an example machine upon which any one or more of the techniques (e.g., methodologies) discussed herein may be performed, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., one or more computers) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks, magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 6G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A system comprising
   a processor;
   a storage device comprising instructions, which when executed by the processor, configure the processor to perform operations comprising:
   during composition of an electronic communication by a first user addressed to a second user identifying a set of parameters associated with the electronic communication;
   determining, during the composition of the electronic communication, an intent of the electronic communication based on the set of parameters;
   searching, during the composition of the electronic communication, an associative data structure associated with the first user to retrieve content that matches a tuple based on one or more of the set of parameters and the intent, the retrieved content being content previously transmitted to a third user by the first user in a previous electronic communication; and
   presenting a suggestion to the first user to use the retrieved content in the electronic communication being composed by the first user addressed to the second user.

2. The system of claim 1, wherein the operations further comprise:
   tokenizing a parameter of the set of parameters; and
   wherein the content associated with the intent is also associated with the tokenized parameter in the associative data structure.

3. The system of claim 1, wherein electronic communication is a response electronic communication to a transmitted electronic communication from the second user and wherein the intent is a request for an attachment.

4. The system of claim 3, wherein the retrieved content is an electronic file transmitted to the third user from the first user associated with the request.

5. The system of claim 1, wherein electronic communication is a new electronic communication to the second user and wherein the intent is a request for information.

6. The system of claim 5, wherein the retrieved content is content transmitted to the third user from the first user in a response to a reply electronic communication from the third user to the first user.

7. The system of claim 1, wherein the electronic communication is a response electronic communication to a transmitted electronic communication from the second user and wherein the intent is a request for location information.

8. The system of claim 7, wherein the retrieved content is location information transmitted to the third user from the first user associated with the request.

9. The system of claim 1, wherein the operations further comprise:
   updating the associative data structure based on a decision to not use the suggestion.

10. The system of claim 1, wherein to update the associative data structure based on a decision to not use the suggestion, a weight associated with the retrieved content is decreased with respect to the intent.

11. A method comprising
    during composition of an electronic communication by a first user addressed to a second user, identifying a set of parameters associated with the electronic communication;
    determining, during the composition of the electronic communication by a processor, an intent of the electronic communication based on the set of parameters;
    searching, during the composition of the electronic communication, an associative data structure associated with the first user to retrieve content that matches a tuple based on one or more of the set of parameters and the intent, the retrieved content being content previously transmitted to a third user by the first user in a previous electronic communication; and
    presenting a suggestion to the first user to use the retrieved content in the electronic communication being composed by the first user addressed to the second user.

12. The method of claim 11, further comprising
    tokenizing a parameter of the set of parameters; and
    wherein the content associated with the intent is also associated with the tokenized parameter in the associative data structure.

13. The method of claim 11, wherein electronic communication is a response electronic communication to a transmitted electronic communication from the second user and wherein the intent is a request for an attachment.

14. The method of claim 13, wherein the retrieved content is an electronic file transmitted to the third user from the first user associated with the request.

15. The method of claim 11, wherein electronic communication is a new electronic communication to the second user and wherein the intent is a request for information.

16. A computer-readable storage device comprising instructions, which when executed by at least one processor, configure the at least one processor to perform operations comprising:
    during composition of an electronic communication by a first user addressed to a second user identifying a set of parameters associated with the electronic communication;
    determining, during the composition of the electronic communication, an intent of the electronic communication based on the set of parameters;
    searching, during the composition of the electronic communication, an associative data structure associated with the first user to retrieve content that matches a tuple based on one or more of the set of parameters and-the intent, the retrieved content being content previously transmitted to a third user by the first user in a previous electronic communication; and presenting a suggestion to the first user to use the retrieved content in the electronic communication being composed by the first user addressed to the second user.

17. The storage device of claim 16, wherein the instructions, wherein the operations further comprise:
determining a second intent of the electronic communication based on the set of parameters;
searching the associative data structure to retrieve second content associated with the second intent previously received by the first user from a fourth user; and
presenting a suggestion in the application to include the retrieved second content in the electronic communication.

18. The storage device of claim 16, wherein the electronic communication is a response electronic communication to the second user and wherein the intent is a request for an attachment.

19. The storage device of claim 18, wherein the electronic communication is a response electronic communication to the second user and wherein the intent is a request for location information.

20. The storage device of claim 16, wherein the electronic communication is a new electronic communication to the second user and wherein the intent is a request for an attachment.

\* \* \* \* \*